United States Patent [19]
Gabzdyl

[11] Patent Number: 5,377,217
[45] Date of Patent: Dec. 27, 1994

[54] GAS MIXTURES FOR EXCIMER LASERS

[75] Inventor: Jacek T. Gabzdyl, Guildford, England

[73] Assignee: The BOC Group plc, Windlesham, England

[21] Appl. No.: 42,374

[22] Filed: Apr. 2, 1993

[30] Foreign Application Priority Data

Apr. 4, 1992 [GB] United Kingdom ............... 9207762

[51] Int. Cl.$^5$ .......................................... H01S 3/22
[52] U.S. Cl. ......................................... 372/60; 372/55
[58] Field of Search ...................... 372/57-59, 372/60, 55

[56] References Cited

U.S. PATENT DOCUMENTS

4,674,099  6/1987  Turner .
5,073,896  12/1991  Reid et al. ....................... 372/59

FOREIGN PATENT DOCUMENTS

0430411  10/1990  European Pat. Off. .

OTHER PUBLICATIONS

Peters et al; "Efficient XeF(C-A) Laser Excited by a Coaxial Elect Beam at Interm. Pump. Ranges", IEE JQE26(1990) Sep., No. 9.

"Improved Lasing Performance of KrCl Excimer Laser", E. Armandillo et al.; 320 Applied Physics Letters, vol. 42(1983) May, No. 10, NY, USA.

Primary Examiner—Léon Scott, Jr.
Attorney, Agent, or Firm—David A. Draegert; Larry R. Cassett

[57] ABSTRACT

A rare gas-halide excimer laser uses a buffer gas consisting of from 5 to 50% by volume helium the balance being neon.

16 Claims, 2 Drawing Sheets

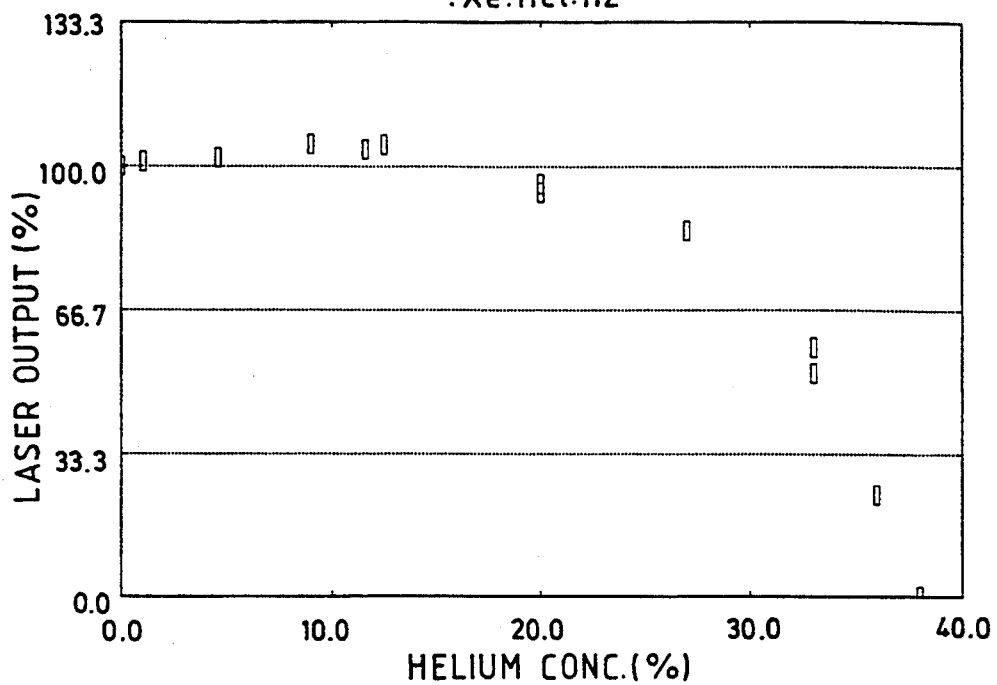
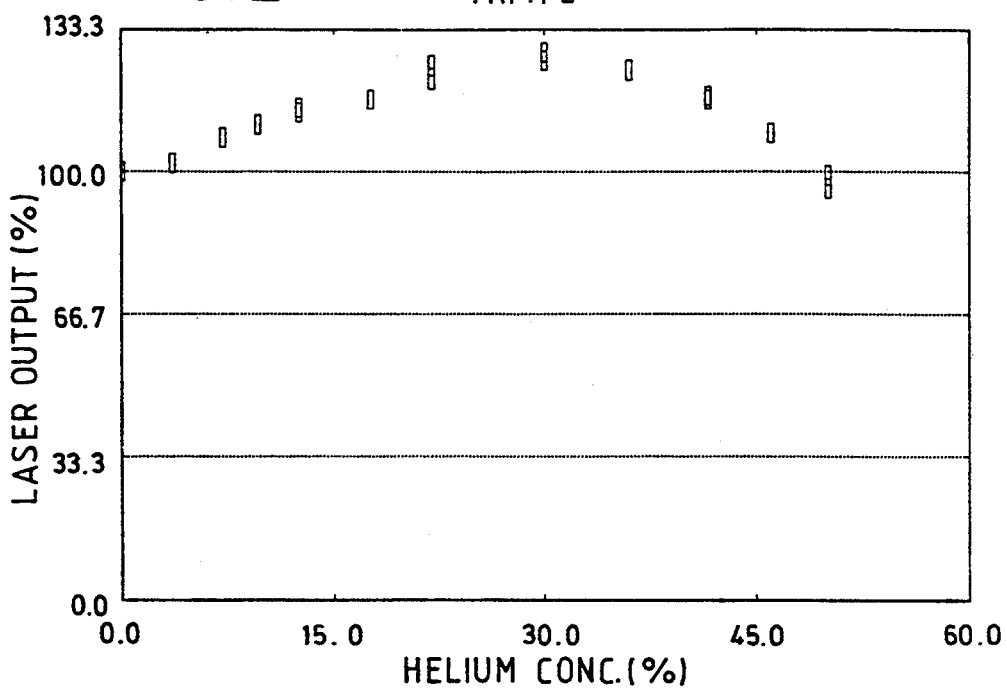

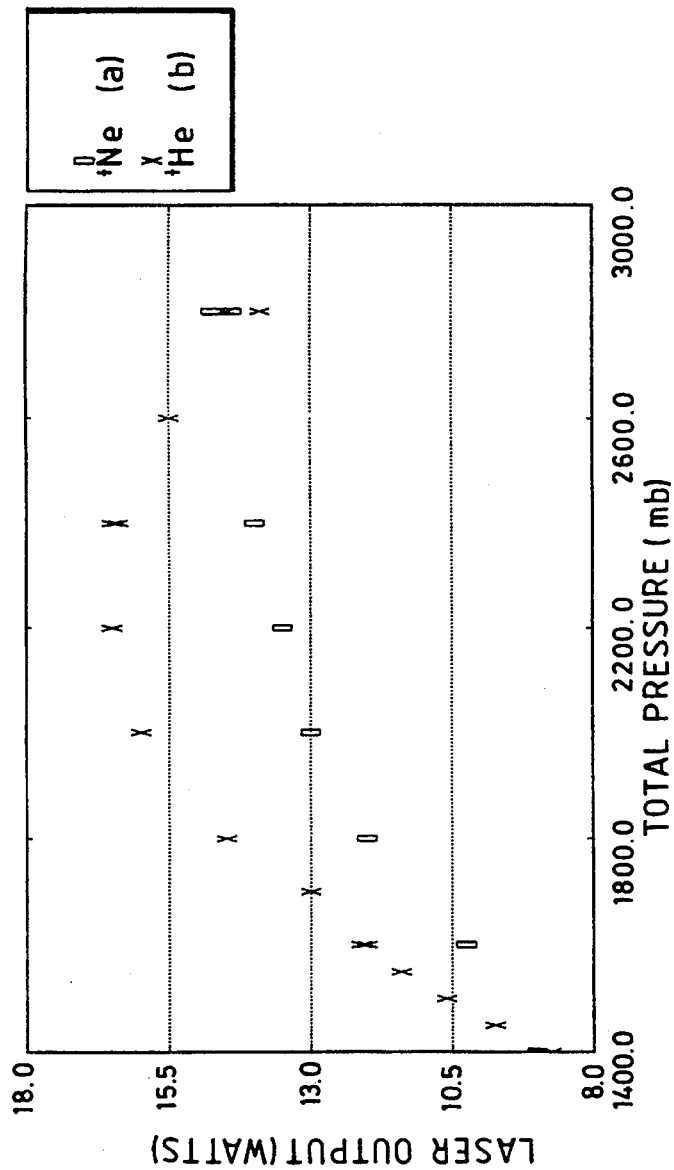

GAS MIXTURES FOR EXCIMER LASERS

FIELD OF THE INVENTION

The present invention relates to rare gas-halide excimer lasers and in particular to gas mixtures for excimer lasers.

BACKGROUND OF THE INVENTION

Excimer lasers are molecular lasers which have a metastable excited state. The lasing medium is a gas which usually consists of active components such as a halogen/rare gas combination in an inert buffer such helium or neon. Heretofore the buffer gas has usually been either pure neon or pure helium. This known choice of neon or helium gives the user the option between a high cost gas with high output power or a low cost gas with a lower laser power output. For example, the use of the relatively cheaper helium as the buffer gas typically yields only 60 to 70% of the power achieved with a pure neon buffer gas.

It is known from European Patent Publication No. 0430411 for a gas mixture for an excimer laser to contain about 99% of one or more of helium and neon. However, this document does not give details of the percentage of helium or neon in the inert buffer. U.S. Pat. No. 4674099 describes a typical lasing gas mixture including a diluent rare gas such as helium and/or neon in concentrations in the order of 95%. Again, this document does not give details of any helium/neon mixture.

For the avoidance of doubt the expression "buffer gas" used throughout this specification is intended to embrace the inert gas(es) which represent the balance of the lasing gas mixture excluding the active lasing constituents.

Laser gases are expensive and efforts are continuously being made to reduce costs in this area.

SUMMARY OF THE INVENTION

It is an aim of the present invention to provide a buffer gas which is relatively inexpensive when compared to substantially pure neon and can provide an increased laser power at a constant gas pressure and excitation voltage.

According to the present invention, in a rare gas-halide excimer laser a gas mixture comprises a rare gas, a halogen or halogen donor gas and a buffer gas consisting of a mixture of from 5 to 50% by volume of helium the balance being neon.

In a preferred embodiment, the buffer gas may comprise 5 to 30% by volume of helium the balance being neon.

At the heart of the present invention is the unexpected effect which a buffer gas comprising a mixture of helium and neon provides in that it allows for an increased laser power at a constant gas pressure and excitation voltage.

BRIEF DESCRIPTION OF THE DRAWINGS

FIG. 1 is a graph which illustrates the effects of a helium/neon buffer gas mixture on laser output power using a XeCl excimer laser;

FIG. 2 is a graph illustrating the effect of a helium/neon buffer gas mixture on laser output power using a KrF excimer laser; and FIG. 3 is a graph illustrating that by using a helium/neon mixture buffer gas the operating pressure at which maximum power can be achieved is reduced when using a KrF excimer laser.

DESCRIPTION OF THE PREFERRED EMBODIMENTS

Embodiments of the invention will now be described by way of example reference being made to the Figures of the accompanying drawings.

The graph shown in FIG. 1 illustrates the results used when operating an XeCl excimer laser using a gas mixture of Xe/HCl/$H_2$ with a buffer gas comprising from 0 to 40% helium with the remainder neon. The graph shows that the buffer gas mixture using 20% helium can yield substantially the same output power as pure neon which is of considerable benefit to the user at it will significantly reduce his gas cost since the costs of neon is considerably more than the cost of helium.

The graph shown in FIG. 2 illustrates the results achieved with a KrF excimer laser which was operated using a buffer gas ranging from 0 to 60% helium with the remainder neon. The graph shows that from 1% up to 50% helium gives an increase in laser output power when compared with pure neon. In this instance increased laser power output of up to 30% has been demonstrated with a buffer mixture of 30% helium and 70% neon.

FIG. 3 shows that by using a helium/neon mixture buffer gas the operating pressure at which maximum power can be achieved is reduced. This graph shows the power output for a KrF excimer laser initially filled with neon to a pressure of 1400 mb with a subsequent addition of (a) neon and (b) helium up to a total pressure of 2800 mb. It can be seen that the maximum power output from the laser can be achieve at a lower total gas pressure using a helium/neon buffer gas mixture.

This is significant in view of the fact that lasing gas costs are a major cost in the operation of lasers.

It will be apparent from the results obtained and illustrated in the FIGS. 1 to 3 that replacing a pure gas, such as helium or neon, with a buffer gas mixture of helium and neon produces unexpectedly beneficial results, such as:

1) An increase in the maximum output power of the excimer laser can be provided over the use or as compared to the use of pure neon or helium. This is a positive deviation and completely unexpected on the usual law of gas mixing.

2) Reducing the cost of the lasing gas mixture over the use of, for example, pure neon.

3) The use of a buffer gas mixture as described above can enable to laser to be operated at lower pressures to achieve maximum power output giving a considerable saving in the gas volumes required to fill the laser cavity.

4) The advantage referred to in 3) above also makes the expectation of the operation of the laser safer as lower operating pressures mean less stress on components such as the output window of the laser through which the laser beam passes.

The exact composition of the buffer mixture for optimum results will, of course, depend on the design features of any particular excimer laser.

What is claimed is:

1. A gas mixture for a rare gas-halide excimer laser comprising a rare gas, a halogen or halogen donor gas and a buffer gas, said buffer gas consisting of a mixture of helium and neon in an amount of from 5 to 50% by volume of helium with the balance of the buffer gas being neon for providing elevated laser output power at a constant gas pressure and excitation voltage.

2. A gas mixture as claimed in claim 1, in which the buffer gas comprises from 5 to 30% by volume of helium the balance being neon.

3. A gas mixture as claimed in claim 2, in which the halogen is fluorine.

4. A gas mixture as claimed in claim 2, in which the halogen donor gas is hydrogen chloride.

5. A gas mixture as claimed in claim 2, in which the rare gas is krypton.

6. A gas mixture as claimed in claim 2, in which the rare gas is xenon.

7. A gas mixture as claimed in claim 1, in which the halogen is fluorine.

8. A gas mixture as claimed in claim 7, in which the halogen donor gas is hydrogen chloride.

9. A gas mixture as claimed in claim 7, in which the rare gas is krypton.

10. A gas mixture as claimed in claim 7, in which the rare gas is xenon.

11. A gas mixture as claimed in claim 1, in which the halogen donor gas is hydrogen chloride.

12. A gas mixture as claimed in claim 11, in which the rare gas is krypton.

13. A gas mixture as claimed in claim 11, in which the rare gas is xenon.

14. A gas mixture as claimed in claim 1, in which the rare gas is krypton.

15. A gas mixture as claimed in claim 14, in which the rare gas is xenon.

16. A gas mixture as claimed in claim 1, in which the rare gas is xenon.

* * * * *